March 13, 1956 M. O. JONES 2,738,009
PUNCHING IMPLEMENT HAVING SPRING PRESSED
BALL OPPOSED TO PUNCH ELEMENT
Filed May 31, 1950
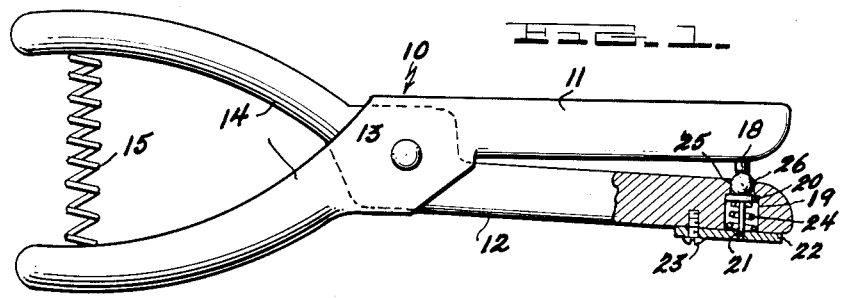
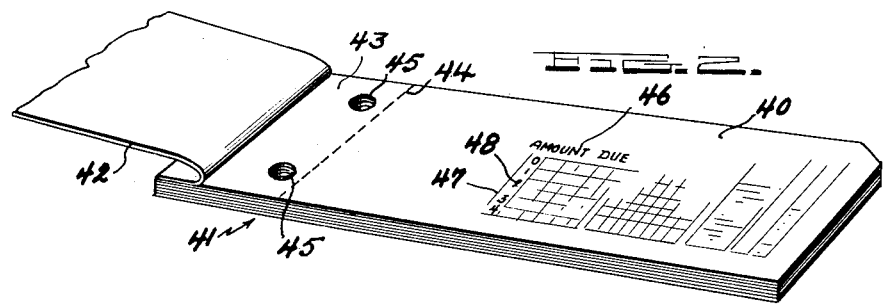
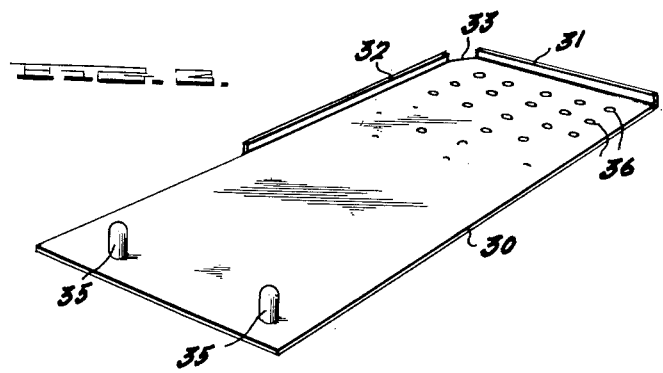
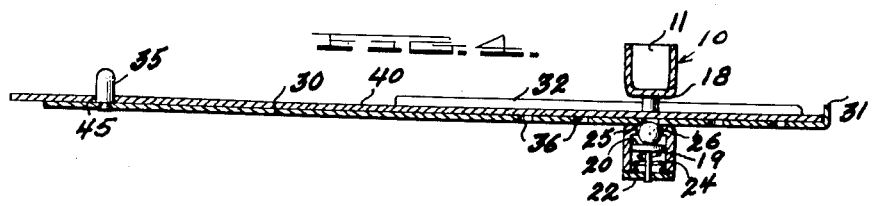
INVENTOR
MONTGOMERY O. JONES
BY Parker and Walsh
ATTORNEYS

United States Patent Office 2,738,009
Patented Mar. 13, 1956

2,738,009

PUNCHING IMPLEMENT HAVING SPRING PRESSED BALL OPPOSED TO PUNCH ELEMENT

Montgomery Osborne Jones, Richmond, Va., assignor to G. Tucker Smith, Coleman Wortham, Jr., and Fielding L. Williams, trustees, all of Richmond, Va.

Application May 31, 1950, Serial No. 165,199

4 Claims. (Cl. 164—121)

This invention relates to a card perforating system and devices used in conjunction therewith.

As is well known, many large organizations now make use of business machines for bookkeeping and various purposes wherein one of the elements used in the record keeping is a card punched at predetermined points to be passed through machines for automatic recording of the data corresponding to the manner in which the card is punched. One class of organizations making use of such system is the various insurance companies, but the value of automatic business machines to such companies is minimized because of the great amount of time required in hand-kept book work before records reach the automatic business machine stage.

For example, men who collect insurance premiums carry with them record books in which the collection of insurance premiums is recorded by hand. At the same time, the collector furnishes the insured with a receipt for payment, usually by making entry by hand in a receipt book issued to the insured. Periodically, the collector is forced to devote a number of hours of time in transferring records from his collection book to record sheets, which are then forwarded to the home office of the company. Machine operators are then forced to devote additional time to the translation of the data on the record sheets to the business machine cards. The work required of several individuals, therefore, amounts to many hours per month which it would be highly advantageous from an economic standpoint to minimize or completely to eliminate.

An important object of the present invention is to provide a novel system by means of which, at the time an initial transaction is made, such as the collection of an insurance premium, the record card can be quickly and easily made, with perforations at the proper points on the card to record the data for the transaction, thus eliminating a substantial amount of paper work.

A further object is to provide a novel system of the character referred to wherein the means employed for practicing the invention not only greatly facilitate the punching of business machine cards at the time of the initial transaction, but also serve to locate the punched openings as accurately as can be done by business machines, thus eliminating the necessity for making innumerable entries by hand, and then translating these entries later to terms of punched business machine cards.

A further object is to provide such a system wherein a perforated plate is provided as a cutting die for use in conjunction with a punch for perforating the sheet at the location of predetermined perforations in the plate, each of such perforations being located accurately at a point relative to the associated card to correspond to certain data to be indicated by the card perforations.

A further object is to provide such a novel system wherein the perforated plate and the cards to be perforated have means coacting exactly to locate the plate and card relative to each other so as to facilitate the accurate location of the perforations.

A further object is to provide a novel combination of a punching device and a perforated plate wherein the punching device is provided with a punch element but no die opening, and wherein the perforations in the plate serve as die openings for the punch element, and wherein the punching device is provided with novel means cooperating with the perforated plate to locate accurately the punch element relative to the plate perforations corresponding to the data to be represented by the punching of the card.

Other objects and advantages of the present invention will become apparent during the course of the following description.

In the drawing, I have shown one embodiment of the invention. In this showing,

Figure 1 is a side elevation of a punching device for use in the practice of the invention, parts being shown in section, Figure 2 is a perspective view of a book of cards bearing indicia thereon representing the various items to be recorded through the perforating of the cards, the cover of the book being broken away, Figure 3 is a perspective view of the perforated plate used in conjunction with the punching device, and Figure 4 is a longitudinal sectional view taken through one of the cards and the perforated plate showing the relative positioning of these elements during the punching operation and showing the punching device in section in operative position ready to perform a punching operation.

Referring to Figure 1, the numeral 10 designates a punching device as a whole comprising upper and lower jaws 11 and 12 respectively pivotally connected as at 13 and provided with operating handles 14 urged apart by a spring 15. Except as noted below, the device 10 has a conventional perforating punch operated by squeezing the handles 14 together, there being means (not shown) for limiting movement of the jaws away from each other.

The upper jaw 11 is provided with a conventional perforating element 18 which, in a conventional punch, enters a die opening in the lower jaw to perforate a card or sheet. In the present invention, no die opening is provided in the lower jaw. This jaw is provided with a recess 19 in which is arranged a plunger 20 having a depending stem 21 projecting through a suitable opening in a bottom plate 22 secured in position in any manner, for example, by a screw 23. A compression spring 24 urges the head or plunger upwardly. The top face of the jaw 12 is provided with an opening 25 which is larger than the usual die opening provided in the lower jaw at such point, and in this opening is arranged a ball 26 normally projecting above the upper surface of the arm 12 and normally contacting with the punch element 18 as shown in Figure 1. The ball 26 may be an ordinary steel ball bearing, and its purpose will be described below.

In Figure 3, there is illustrated a plate 30 adapted for use in connection with the punch device. The plate normally occupies the position shown in Figure 3 and, as viewed therein, is provided at one end with a relatively narrow upstanding flange 31, and along its upper or remote longitudinal edge is a similar flange 32. The flanges 31 and 32 preferably terminate at points spaced from the adjacent corner of the plate 30 and such corner may be cut off as at 33. Adjacent its end opposite the flange 31, the plate 30 is provided with a pair of upstanding studs 35, preferably circular in cross section with rounded upper ends, for a purpose to be described. The plate is provided with perforations 36 having exact predetermined locations, the purpose of which is also described below. Each perforation 36 corresponds in diameter to the punching element 18 to serve as a die opening therefor, as described below.

The plate 30 is adapted to be employed in conjunction with a plurality of cards 40 (Figure 2), these cards preferably being arranged in a book indicated as a whole by the numeral 41, having a cover 42. This cover is bound to the book, and partly for the purpose of providing each card with space for binding in the book as well as for other purposes to be described, each card carries a stub 43 to which it is connected along a perforated line 44. Each card is readily severable along its line 44, as will be apparent.

All of the cards of the book are punched to provide openings 45 corresponding in size and arrangement to the studs 35. Each card 40 is provided with indicia 46 associated with printed blocks, columns, squares, or the like 47 containing numbers, letters, or other indications 48 relating to the indicia 46. Every square or block containing a number corresponds in its position on the card 40 to one of the openings 36 so that each number is subject to being subjected to the action of the punch element 18 to perforate the card 40 at that point in accordance with the practice of the invention, the operation of which is described below.

*Operation*

The invention may be used in conjunction with one or more cards at each punching operation, depending upon the nature and practices of the business in connection with which the invention is being used. For example, one card may be punched for return to the home office of an insurance company, a second may be retained by the collector, and a third left with the insured as a receipt. It will become obvious that the practice of the invention is not limited in its use to the simultaneous punching of any particular number of cards.

Assuming that a collection for an insurance policy is to be made, the collector will call on the insured, collect the amount due on one or more policies, and then proceed to punch one or more of the cards. In this particular business, the cards will be marked as to amounts due, the number of weeks to be paid in advance, the number of policies on which payment is being made, etc. Knowing the data in accordance with which the card is to be punched, the collector will lift one or more cards from the top of the book, depending upon how many records are to be kept, and will then slip the plate 30 under such card or cards until the studs 35 come into registration with the openings 45 of the cards thus lifted. The cards will drop over the studs 35 and, at such time, the flanges 31 and 32 will be in engagement with the right hand and remote edges of the cards as viewed in Figure 2. The collector is now ready for the punching operation.

The operator will grasp the lifted cards and the plate 30 between the thumb and forefinger of the left hand, the thumb resting on the top card and the forefinger engaging beneath the plate 30. The collector will grip the cards and plate 30, holding the plate 30 with its flanges 31 and 32 properly positioned relative to the card or cards. Under such conditions, one of the openings 36 will be arranged precisely beneath each block containing a number 48. Grasping the punch 10 in the right hand, the operator will move the plate and cards relative to the punch to insert the plate and cards between the jaws 11 and 12. This inserting operation will result in depressing the ball 26 against the tension of the spring 24. The top card will be fully visible, and the operator will move the punch relative to the card to place the punching element 18 to an initial position over one of the numbers 48 to be punched. As the proper position of the punch is approached, the ball 26 will snap into the corresponding opening 36, thus exactly positioning the punch 18 relative to the first number to be punched. The operator will then squeeze the handles 14 together, thus causing the punch element to penetrate the card or cards and enter the corresponding opening 36. Each opening 36 corresponds in shape and size to the punch element 18 to act as a die opening therefor, thus effecting the cutting of a clean opening through each card.

It will be apparent that since the ball 26 will have snapped into the proper opening 36, the ball will project partly through the plate 30, and when the punch is operated and the punch element 18 enters the proper opening 36 to perforate the card, the punch element 18 will depress the ball 26 against the tension of the spring 24. When the punch is released, the ball 26 will move back into engagement with the opening. The collector will then move the punch to provide the next perforation. The roundness of the ball, engaging the first opening 36, holds the punch in proper position during the punching operation, but the ball readily snaps out of the opening upon exertion of slight force against the punch, thus permitting the punch to be moved to the next desired spot on the card or cards to be punched. As each selected opening 36 is reached, the ball 26 will snap into such opening to exactly place the punch with respect to the point on the card or cards to be perforated. This operation is continued until the card has been perforated to record all of the data necessary to provide a record of the transaction.

The collector will then detach one or more of the punched cards to be retained as a record. These punched cards are collected and at the end of stated periods, for example, each week or each month, the collector will forward all of the cards punched during the preceding period to the home office of the insurance company. The collector need not make by hand any record sheet of the various transactions to be mailed to the home office, it merely being necessary to mail to the home office the cards which have been punched during the preceding period. When these cardsd are received at the home office, it is not necessary for machine operators to translate hand-prepared records into terms of perforated business machine cards, since this work already will have been performed.

From the foregoing, it will be apparent that the present invention provides hand-operated means through which business machine cards can be quickly punched as accurately as can be done by automatic business machines, thus providing permanent perforated record cards at the time of each transaction. The invention thus saves innumerable hours of work over a stated period by completely eliminating the previously necessary time required for the preparation of records and the translation of such records into terms of business machine cards. This obviously results in a great saving of time for collectors, and obviously also saves a great deal of time and expense at the home office of a company which normally is required to do the translating work.

I claim:

1. In a card perforating system for a card having data markings in predetermined positions thereon, a punch having a punch element movable over the card, a plate adapted to be arranged beneath said card in predetermined relation thereto, said plate having die openings corresponding in position to the data markings on said card when said card and said plate are in said predetermined relation, and an upwardly spring-pressed ball carried by said punch and adapted to be positioned beneath said plate in axial alignment with said punch element, said ball being larger than and engageable in any opening of said plate to locate said punch element relative to any selected data marking on said card whereby, when said punching mechanism is operated, said card will be perforated accurately relative to the selected data marking.

2. In a card perforating system for a card having data markings in predetermined positions thereon, a plate adapted to be arranged beneath said card in predetermined relation thereto, said plate having a plurality of openings corresponding in positions to the respective data markings on said card when said card and said plate are in said predetermined relation, and a punch comprising relatively movable upper and lower arms between which said card and said plate are adapted to be moved, the upper arm of said punch having a punch element corresponding in shape and size to each of said openings in said plate whereby such openings are adapted to act as die openings for said punch element, said lower arm having an opening alined with and larger than said punch, and a ball carried by the lower arm of said punch in said opening in axial alignment with said punch element and spring pressed upwardly to a normal position projecting above the upper surface of said lower arm to engage any opening in said plate to accurately position said punch element relative to any selected data marking on said card whereby said card will be accurately perforated at such data marking when said arms are moved toward each other, said lower arm having an upper face lying in a plane above the center of said ball, whereby the latter is manually movable with said punch over the bottom face of said plate.

3. A punch for use in a card perforating system, comprising a pair of arms pivotally connected to each other and having handles operable for moving said arms toward each other, one of said arms carrying a punch element rigid therewith and projecting toward the other arm, the other arm having an opening aligned with and larger than said punch, and a spring-pressed positioning ball carried by said other arm in said opening, said spring-pressed ball being urged toward and normally engaging said punching element and normally projecting beyond the surface of said other arm toward said one arm.

4. A punch for use in a card perforating system, comprising a pair of arms pivotally connected to each other and having handles operable for moving said arms toward each other, one of said arms carrying a punch element rigid therewith and projecting toward the other arm, a recess in said other arm, a plunger in said recess, a spring in said recess urging said plunger toward said punch element, said other arm at the side adjacent said one arm having an opening of reduced size larger than said punch element, and a ball in said opening, said ball being engaged by said plunger and urged thereby toward said punch element and normally engaging the latter and normally projecting beyond the surface of said other arm toward said one arm.

References Cited in the file of this patent

UNITED STATES PATENTS

| | | |
|---|---|---|
| 278,091 | Burk | May 22, 1883 |
| 320,785 | Hill | June 23, 1885 |
| 585,357 | Caldwell | June 29, 1897 |
| 998,541 | McBee | July 18, 1911 |
| 1,121,604 | Bein | Dec. 22, 1914 |
| 1,649,635 | Willard | May 15, 1927 |
| 1,871,597 | English | Aug. 16, 1932 |
| 1,909,360 | Jorgenson et al. | May 16, 1933 |
| 2,394,385 | Hueber et al. | Feb. 5, 1946 |